3,240,827
PROCESS FOR THE OXYCHLORINATION OF ALIPHATIC HYDROCARBONS
François Lainé, 25 Rue Tarbe-des-Sablon, Eaubonne (Seine-et-Oise), France; Claude Kaziz, 6 Ave. Roger Salengro, La Courneuve (Seine), France; and Georges Wetroff, 4 Ave. Hoche, Le Thillay (Seine-et-Oise), France
No Drawing. Filed July 10, 1962, Ser. No. 208,956
Claims priority, application France, July 13, 1961, 867,939
10 Claims. (Cl. 260—659)

This invention relates to the chlorination of hydrocarbons and particularly aliphatic hydrocarbons by catalytic reaction at elevated temperature in the presence of hydrogen chloride and oxygen, with or without dilution by an inert gas, and it relates more particularly to a new and improved reactor and Deacon type catalytic system employed in same for carrying out the catalytic reaction without the development of hot spots whereby the catalyst remains in better condition and more efficient and effective use is made thereof.

One of the principal difficulties encountered in the oxychlorination of hydrocarbons with a Deacon type catalyst resides in the development of hot spots. Such hot spots tend to induce secondary reactions which reduce the yield of desirable product and complicates the isolation or purification thereof and it also leads to combustion of the hydrocarbons in the presence of the oxygen further to interfere with the proper conduct of the process.

A technique that has been adopted to minimize the development of hot spots in isolated portions of the catalytic system has been to provide for partial or incomplete reaction of the gaseous components circulated through the catalytic system thereby to minimize temperature rise. However, this technique raises additional problems in that it becomes necessary to separate the unreacted hydrocarbons and gases from the remainder and such separation is made even more difficult when the oxygen is diluted with an inert gas, such as air.

Attempts have also been made to carry out the catalytic reaction with minimum development of hot spots by the use of a catalytic system in the form of a fluid bed wherein the catalytic agent is maintained in suspension or movement in the gaseous stream. This technique is also faced with its difficulties because it becomes necessary to provide for separation of solid materials entrained within the gaseous stream issuing from the reactor.

Another concept that has been tried in the attempt to avoid the development of hot spots has been the dilution of the carrier impregnated with the catalyst with carriers or in the materials that have not been impregnated with the catalyst thereby to dilute the reaction and spread the reaction.

This arrangement has been found to be inefficient and differences of more than 100° C. are still experienced in the catalytic system, especially if the reaction is carried out at a high conversion rate. As a result, secondary reactions and hydrocarbon combustion are still experienced unless the gases are only partially reacted, as previously described, whereby it becomes necessary to separate out and recycle the unconverted gases.

It is an object of this invention to produce a reactor and a catalytic system for use in same for the oxychlorination of hydrocarbons, such as aliphatic hydrocarbons, in a safe and efficient manner and without the development of hot spots. It is a related object to provide a catalytic system and method for chlorination of hydrocarbons in the presence of hydrogen chloride and oxygen without the difficulties that have heretofore been experienced and to make most efficient use of the catalyst and to achieve high yield of product with very little, if any, by-products requiring difficult separation.

The concepts of this invention reside in the use of a catalytic system having at least 50 percent of its volume composed of macroporous carbon, such as small particles of porous graphite, porous coke, or mixtures thereof. The invention contemplates the use of such porous carbon in admixture with activated alumina or other carrier impregnated with the catalyst, such as copper chloride; it contemplates the use of the macroporous carbon as the carrier for the catalytic agent wherein the catalytic system comprises an istropic system; or it contemplates the use of one portion of porous carbon impregnated with the catalytic agent in admixture with another portion of porous carbon which has not been impregnated and thus does not function as a carrier for the catalytic agent.

The porous grains of graphite or coke, when used in admixture with the catalytic agent carried on activated alumina or other carrier, are of such similar specific gravity as the activated alumina as to provide for a stabilized catalytic system wherein the materials remain in uniform distribution by comparison with the undesirable stratification that takes place when metals of high heat conductivity are employed in combination with the activated alumina or catalyst carrier for conducting the heat of reaction from the catalytic system. When the catalyst carrier and the heat conducting medium constitute the one and the same porous graphite, coke, or other porous carbon, an isotropic filling of the reaction chamber is achieved with little, if any, danger of separation or stratification of the materials. It is for this reason that porous graphite or coke or other carbon provides excellent use, either alone or in combination with the activated alumina impregnated with the copper chloride or other catalytic agent to provide a catalytic system or bed. In the system described, the porous carbon component remains in the desired distribution in the catalytic system for rapid conduct of the heat of reaction for uniform distribution throughout the catalytic system to prevent the formation of hot spots and for carrying the heat away from the catalytic bed to the walls of the chamber where it may be removed by heat exchange with coolants circulated through a jacket about the chamber.

When use is made of the porous carbon as a carrier for the catalyst, the porous carbon can be impregnated with a solution of the catalytic agent. A cupric chloride or other metal chloride in solution is used in an amount to introduce 0.1 to 20 percent by weight metallic chloride based upon the impregnated carrier, when dried as by elevated temperature. In the practice of this invention, in the use of the macroporous carbon either as a carrier for the catalyst or as a diluent in the catalytic bed, it is desirable to make use of porous carbon having a specific surface less than 100 m.²/g. and preferably a few square meters per gram. For this purpose, use can be made of coke prepared from coal, petroleum, or pitch by conventional methods.

When the porous carbon is employed in combination with another catalytic carrier, such as grains of alumina impregnated with catalyst, it is desirable to make use of the materials in the ratio of 5 to 30 percent by volume of the carrier to 95 to 70 percent by volume of the grains of porous carbon with the grains of the carrier and carbon being dimensioned to be between ⅕ to ½₀ the cross-section of the reactor and it is preferred to make use of such grains in the range of 1 to 3 mm. in cross-section. When use is made of an isotropic system wherein the porous carbon is employed in whole or in part as the carrier for the catalyst, it is desirable to make use of porous carbon particles dimensioned to correspond to $\frac{1}{5}$ to $\frac{1}{50}$ the cross-section of the reactor and preferably between 1 to 3 mm. in cross-section.

In the use of a catalytic system of the type described, the reactor in which the catalytic system is introduced should be of relatively small cross-section so that the heat evolved by the reaction can be conducted rapidly to the walls of the reactor for removal. For example, when use is made of a reactor in the form of cylindrical tubular members, it is desirable to make use of tubes which do not exceed about 10 cm.

The use of a catalytic system embodying porous carbon in the manner described has been found to permit the maintenance of substantially homogeneous temperature throughout the catalytic bed. A high reaction rate for conversion can be carried out without the development of hot spots thereby to avoid the necessity for incomplete reaction, separation and recycling of unreacted gaseous components as is characteristic of systems which have heretofore been employed.

In the chlorination of an unsaturated or olefinic hydrocarbon, saturation of the olefinic bond by chlorine can be achieved at a lower temperature than that required for the substitution of chlorine onto the hydrocarbon molecule. Such use of lower temperature coupled with the uniformity of temperature distribution throughout the catalytic system substantially eliminates the presence of secondary reactions and it permits direct selective chlorination of the double bond to produce a chlorinated product in high yield and of high purity.

The chlorination of unsaturated or olefinic hydrocarbons can be carried out at a temperature within the range of 250–400° C. and at spatial speeds depending somewhat on the porosity of the catalytic bed. The flow rate of the gaseous ingredients is selected to provide for a contact time in the reactor, calculated as the time required for flow of the gaseous materials through the reactor, in the range of 2 to 20 seconds.

The following examples are given by way of illustration, but not by way of limitation, of the practice of this invention:

Example 1

A catalytic system is prepared by mixing 90 parts by weight of porous graphite and 10 parts by weight of activated alumina impregnated with cupric chloride and calculated to have a copper content corresponding to about 10 percent by weight of the alumina. The porous graphite has a specific surface of 0.5 m.$^2$ per gram, a density of 1.6 and pores having a diameter between 0.1 and 5 microns. The graphite and the alumina are used in the form of grains having a mean dimension between 1 and 3 mm. A cylindrical metallic tube is filled with 700 cm.$^3$ of a uniform mixture of the materials making up the catalytic system which occupies a length of about 60 cm. of the tube. A gaseous mixture of 21 l. of hydrochloride acid, 30 l. of air and 11 l. of ethylene is passed in admixture through the reactor. The walls of the reactor are cooled by heat exchange with a recirculating coolant, such as oil, having a temperature sufficient to maintain the catalytic mass at about 290° C.

Measurements taken at different points of the catalytic bed indicate that very little temperature differential exists. The vapors issuing from the reactor are advanced to a cooler or condenser and then separation is made of the condensed organic liquid containing 99.2 percent by weight of 1-2 dichlorethane and 0.8 percent chlorinated impurities composed mainly of dichlorethylenes and trichlorethanes. The uncondensed gases are composed by volume of 95.6 percent nitrogen, 2.8 percent ethylene, 0.2 percent oxygen, 0.6 percent carbon monoxide, 0.6 percent carbon dioxide, and traces of vinyl chloride and ethyl chloride. The conversion rates of the ethylene, oxygen and hydrochloric acid are respectively, 93.5, 99.2, and 92.4 percent.

Example 2

The procedure that is followed in this example is similar to that of Example 1 except that the porous graphite is replaced by porous pitch coke. When the reactor is filled with the catalytic system, a gaseous mixture is advanced through the reactor composed of hydrochloric acid, air and ethylene in stoichiometric proportions and a flow rate is maintained such that the time for passage of the gases through the metallic tube is in the order of 9.5 seconds. The temperature of the reaction zone is about 337° C. Under these conditions, a conversion rate of the ethylene of 94.5 percent is obtained. The organic phase which is condensed at ambient temperature contains 98.7 percent by weight 1-2 dichlorethane, 1–2 percent of 1-1-2 trichlorethane, and 0.1 percent by weight of traces of other chlorinated derivatives.

Example 3

A catalytic mass is prepared in the following manner: 1000 grams of porous graphite is reduced to an average grain size of between about 1 to 3 mm. The grains are wet as by immersion in a solution of 26.8 grams of copper chloride in 300 cm.$^3$ of water to which 550 cm.$^3$ of acetone has been added. The mixture is stirred for 2 hours and then the solvent is removed by evaporation under vacuum at about 50° C. and the residue is dried for about a day at 110° C. The copper content based upon the graphite is about 1 percent by weight. The reactor of Example 1 is filled with 700 cm.$^3$ of the impregnated graphite and gaseous reactants in the form of ethylene, hydrogen chloride and air are introduced in stoichiometric proportions at a rate to maintain a temperature, at the hottest point, of 386° C. The conversion rate of the ethylene is 91.9 percent and the organic product condensed at ambient temperature has the following composition:

| | Percent |
|---|---|
| Trans 1-2 dichlorethylene | 0.2 |
| Cis 1-2 dichlorethylene | 0.7 |
| Trichlorethylene | 0 |
| 1-2 dichlorethane | 96.3 |
| 1-1-2 trichlorethane | 2.7 |
| Traces of other chlorinated derivatives | 0.1 |

As a comparison, runs similar to the preceding examples have been carried out in accordance with the following examples but in which use is made of activated coal instead of graphite or coke.

Example 4

A catalyst is prepared according to Example 3 but in which use is made of activated coal as the carrier (type AC 35 from Societe Carbonisation et Charbons Actifs in Paris) having a specific surface corresponding to 1200 m.$^2$ per gram. Use is made of the same reactor as in the preceding Examples 1–3 in which the tube is filled with 700 cm.$^3$ of the catalyst. The gaseous reagents are introduced into the reactor in stoichiometric quantity at a rate for flow through the reactor in 20 seconds. The temperature of the reaction zone will not exceed 372° C.

The conversion rate of ethylene, under these conditions, is in the order of 66.5 percent and the organic phase that is condensed at ambient temperature has the following composition:

| | Percent |
|---|---|
| Trans 1-2 dichloroethylene | 1.9 |
| Cis 1-2 dichlorethylene | ⎫ |
| 1-1-1-trichlorethane | ⎬ 2.4 |
| Vinyl chloride | ⎭ |
| 1-2 dichlorethane | 85.7 |
| 1-1-2 trichlorethane | 7.0 |
| Other chlorinated derivatives | 0.3 |

Example 5

A catalyst is prepared in the same manner as in Example 4 but in which the catalyst is present in an amount calculated to give 0.5 percent by weight of copper. Chlorination is carried out in a manner similar to that as in the preceding Example 4. A temperature of 370° C. is maintained in the reaction zone. The composition of the condensed organic phase issuing from the reactor is as follows:

|   | Percent |
|---|---|
| 1-2 dichlorethane | 98.8 |
| 1-1-2 trichlorethane | 0.9 |
| 1-1-1 trichlorethane | 0.1 |
| Ethyl chloride | 0.2 |

The conversion rate of ethylene is in the order of 66.5 percent.

Example 6

With the same catalyst as in Example 4, chlorination of the ethylene is carried out in a manner similar to that of Example 3 but the reagents are introduced in an amount to provide for an increased flow rate of about 10 seconds. The temperature in the reaction zone is about 370° C. The condensed organic phase of the effluent from the reactor has the following composition:

|   | Percent |
|---|---|
| 1-2 dichlorethane | 98.3 |
| 1-1-2 trichlorethane | 1.0 |
| Cis dichlorethylene | 0.1 |
| Vinylidene chloride | 0.1 |
| Ethyl chloride | 0.2 |
| 1-1-1 trichlorethane | 0.2 |
| Traces of other chlorinated derivatives | 0.1 |

The conversion rate of the ethylene is about 56.8 percent.

It will be noted from the foregoing by comparison of the results from Examples 4–6 with those of Examples 1–3 that the use of microporous carbon having a high specific surface as a component of the catalytic system, as in Examples 4–6, gives a conversion rate of aliphatic hydrocarbon considerably lower than those obtained with macroporous hydrocarbon having a low specific surface, as in Examples 1–3.

It will be understood that changes may be made in the details of the equipment, compositions and method without departing from the spirit of the invention, especially as defined in the following claims.

We claim:

1. In a process for the chlorination of hydrocarbons selected from the group consisting of olefinic hydrocarbons and saturated hydrocarbons, the step of passing the hydrocarbon in admixture with hydrogen chloride and oxygen through a catalytic bed consisting essentially of a uniform mixture of 5–30 parts by volume of a carrier having a Deacon type catalytic agent thereon and 95–70 parts by volume of macroporous carbon having a specific surface of less than 100 m.$^2$/g.

2. A process as claimed in claim 1 in which the carrier and carbon are dimensioned to correspond to 1 to 3 mm. in cross-section.

3. A process as claimed in claim 1 in which the carrier is porous aluminum oxide.

4. A process as claimed in claim 1 in which the catalytic bed is composed substantially entirely of macroporous carbon partially impregnated with a catalytic agent.

5. In a process for the chlorination of hydrocarbons selected from the group consisting of olefinic hydrocarbons and saturated hydrocarbons, the steps of passing the hydrocarbons in admixture with hydrogen chloride and oxygen through a catalytic bed, and wherein the catalytic bed contains 50–95 percent by volume of macroporous carbon with the balance consisting of a Deacon type catalyst impregnated carrier, said carbon having a specific surface of 2–100 m.$^2$ per/gm.

6. A process as claimed in claim 5 in which the hydrocarbon is an olefinic hydrocarbon.

7. A process as claimed in claim 5 in which the macroporous carbon is porous graphite.

8. A process as claimed in claim 5 in which the macroporous carbon is porous coke.

9. A process as claimed in claim 5 in which the catalytic bed consists essentially of porous carbon wholly impregnated with the catalyst.

10. A process as claimed in claim 5 in which the catalytic bed consists of porous carbon partially impregnated with the catalyst.

References Cited by the Examiner

UNITED STATES PATENTS

| 1,591,984 | 7/1926 | Krause et al. | 260—659 |
| 1,654,821 | 1/1928 | Krause et al. | 260—659 |
| 2,636,864 | 4/1953 | Pye et al. | 252—441 |
| 2,644,846 | 7/1953 | Johnson et al. | 260—659 X |
| 2,674,633 | 4/1954 | Reitlinger | 260—659 X |
| 2,866,830 | 12/1958 | Dunn et al. | 260—659 X |
| 3,055,955 | 9/1962 | Hodges | 260—656 |

LEON ZITVER, *Primary Examiner.*

K. V. ROCKY, *Assistant Examiner.*